TRIGGER THRESHOLD TOGGLE FOR TRIGGERED TYPE MULTIVIBRATORS

Filed Sept. 14, 1959

INVENTORS.
DAVID E. EARLS
GEORGE F. MORRIS
BY
F. L. Stymer
ATTORNEY

United States Patent Office 3,066,262

Patented Nov. 27, 1962

3,066,262

TRIGGER THRESHOLD TOGGLE FOR TRIGGERED TYPE MULTIVIBRATORS

David E. Earls, Webster, and George F. Morris, Rochester, N.Y., assignors to General Dynamics Corporation, Rochester, N.Y., a corporation of Delaware Filed Sept. 14, 1959, Ser. No. 839,631
5 Claims. (Cl. 328—196)

This invention relates to triggered multivibrator circuits and is particularly directed to means for increasing the sensitivity of the multivibrator to triggering pulses within a noise background while at the same time increasing the stability of the multivibrator.

Many practical uses of the multivibrator require that the multivibrator be triggered only by triggering pulses equal to or in excess of a predetermined voltage threshold, and that the multivibrator be triggered continuously as long as the triggering pulses exceed this predetermined voltage. It is easy to build a multivibrator with any given trigger threshold, but, unfortunately, noise in the system will randomly modify the threshold level and/or the pulse amplitude. Then, if the trigger pulse happens to be just equal to the threshold value, the multivibrator will trigger erratically over an amplitude band.

An object of this invention is to provide an improved triggered multivibrator by eliminating the amplitude band of erratic triggering.

A more specific object of this invention is to provide an improved multivibrator in which the threshold triggering level is stabilized.

A more specific object of this invention is to provide an improved multivibrator in which the threshold triggering level is automatically switched between two preset values.

The multivibrator of this invention is of the monostable or one-shot type and comprises means for applying a toggle voltage to the triggering circuit. As soon as the triggering pulses become large enough to trigger the multivibrator, then the threshold level is reduced slightly so that following triggering pulses, including those trigger pulses which may be reduced in amplitude by noise, will also trigger the multivibrator. Likewise, if the amplitudes of the triggering pulses are reduced until several of the triggering pulses are below the new threshold level and do not cause triggering, the threshold level of the multivibrator will be increased so that none of the pulses can cause triggering. That is, the improved multivibrator of this invention is either fully "on" or fully "off" as the triggering pulses gradually vary in amplitudes above and below an optimum threshold voltage.

Figure 1:
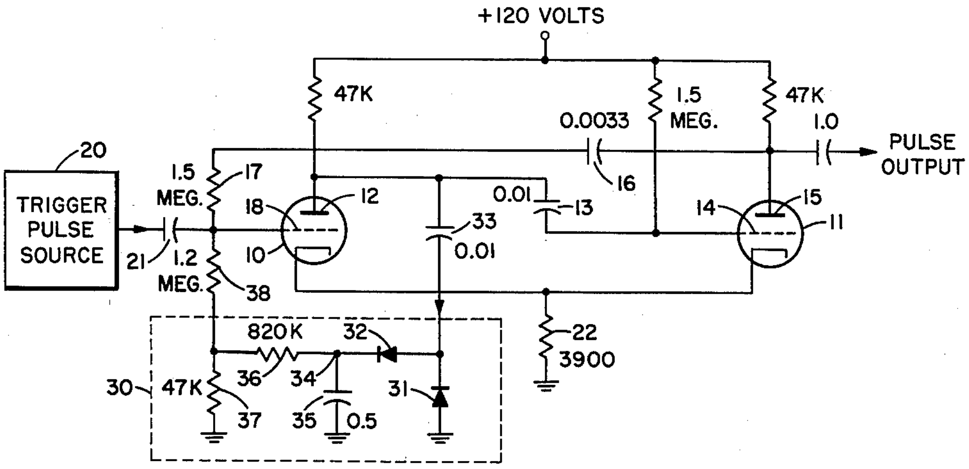
Figure 2:
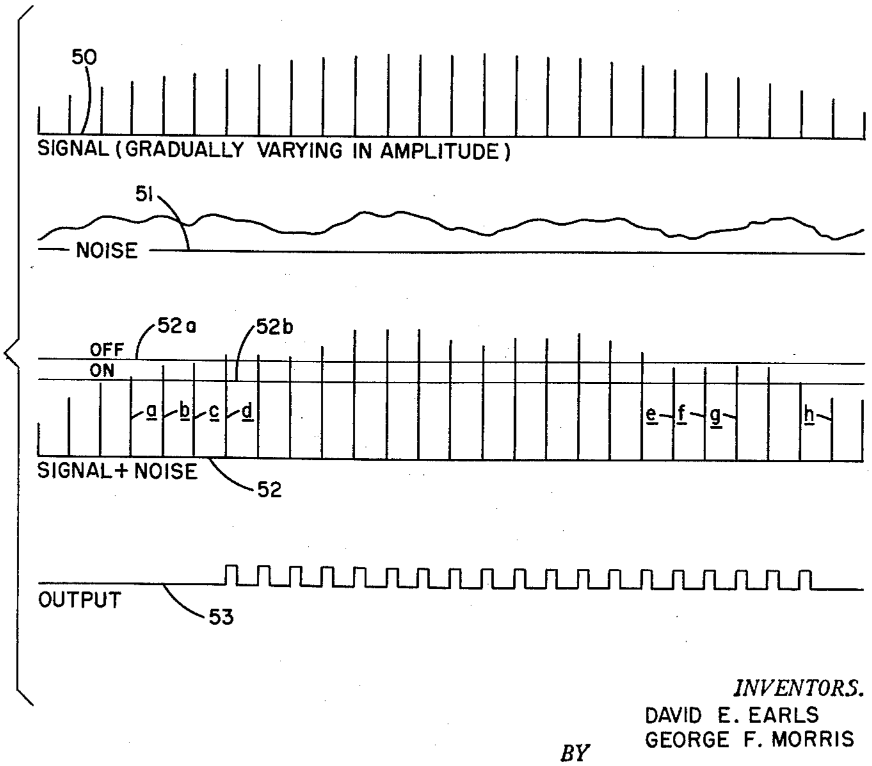

Other objects and features of this invention will become apparent to those skilled in the art by referring to the specific embodiments described in the following specification and shown in the accompanying drawing in which:

FIG. 1 is a schematic circuit diagram of one preferred embodiment of this invention; and, FIG. 2 is a voltage diagram of the input and output voltages of the system of FIG. 1.

The multivibrator of FIG. 1 comprises two vacuum tube amplifiers 10 and 11. Triodes have been chosen for illustration purposes, although other types of amplifiers, including transistors, could be employed, if desired. The output electrode or anode 12 is coupled through capacitor 13 to control electrode or grid 14 of amplifier 11, and anode 15 is coupled through capacitor 16 and biasing resistor 17 to grid 18 of amplifier 10 in the usual cross-coupled feedback arrangement. The source 20 of trigger pulses is coupled to the control electrode 18 through coupling capacitor 21. While the pulses of the source 20 may be of many types, the pulses contemplated here are of the video type in which the duration and energy content of the discrete pulses may be quite small. The feedback circuits and the component parameters have been so chosen that the multivibrator shown is essentially monostable in character. That is, tube 10 is normally cut off while tube 11 is normally conducting, the common cathode resistor 22 being of sufficient value to maintain the cathode of tube 10 at a relatively high positive potential, and thus holds the tube 10 cut off for any given grid potential. The grid-cathode cut off voltage may be established by adjusting the cathode potential, as is well known. Accordingly, the grid-to-cathode bias determines the amplitude of the positive voltage which must be applied to the grid 18 to carry the grid out of the cut off region and initiate tube conduction.

According to an important and characteristic feature of this invention, the grid-cathode bias of tube 10 is automatically varied by a peak detector coupled between the output of one of the amplifiers, 10 or 11, and the input or trigger circuit of tube 10. A voltage produced by the peak detector is applied regeneratively as distinguished from degeneratively, to the trigger circuit. The particular peak detector shown in FIG. 1 comprises the diodes 31 and 32 so polarized that positive pulse voltages applied through coupling capacitor 33 will apply a unidirectional positive voltage at terminal 34 of capacitor 35. A succession of positive pulses can charge capacitor 35 to a voltage near the peak voltage of the positive pulses appearing at anode 12. The capacitor 35 is relatively large, and the leak circuit including resistors 36 and 37 is relatively large to adjust the time constant of the filter 30 to a relatively high value. The particular capacity and resistance values shown on the face of FIG. 1, have been chosen to produce a peak bias on grid 18 after about five pulses at a repetition rate of 2000 pulses per second. It is important to note that the rectifier shown is a "peak detector" and its output is proportional to the peak amplitude of the output pulse of tube 10, and is nearly independent of the frequency of the triggering pulses and of the duty cycle. The peak detector is to be distinguished from the averaging or integrating circuits of conventional automatic gain control, the feedback voltage of which is degeneratively applied to the input of the amplifier to be controlled. The proportion of the bias voltage accumulated at capacitor 35, and which is applied to grid 18, depends upon the relative values of resistors 36, 37 and 38.

Capacitor 33 may be coupled to the anode 15 of triode 11 instead of the anode 12 of triode 10, if desired. The choice of this connection depends only upon the duty cycles of the two triodes, it being preferred to couple to the particular anode which is off for the greatest proportion of time or which has the longest positive duty cycle.

According to this invention, then the multivibrator output pulse is rectified, filtered, and returned to the input trigger grid as a bias which reduces the effect of the cathode bias caused by resistor 22. The value of the grid bias with respect to the cathode determines the threshold level at which trigger action is initiated, large negative bias requiring larger trigger pulses or small negative bias requiring small trigger pulses. In operation, triode 10 is biased beyond cut off by a positive cathode and will remain stably cut off until a series of triggering pulses are received which are well above the noise background and which will trigger the triode 10 "on," usually for a number of cycles. This number of cycles of "on" operations is sufficient to charge capacitor 35 to, in turn, raise the grid potential at 18. With the new grid bias, the trigger pulse amplitude may actually drop below the initial level of the trigger pulses without interrupting the triggering of the multivibrator. If the trigger pulse amplitude continues to drop, finally a threshold is passed to which the multivibrator stops, whereupon the grid-cathode bias returns to its full cutoff value, and any new trigger pulses must have the greater amplitude required. That is, grid 18 receives a bias that is relatively high at the beginning of operation, and reduces after operation starts. Conversely, the bias remains low until the triggering amplitude drops below a predetermined level at which time multivibrator operation ceases and the bias assures stable "off" operation. That is, the trigger grid receives a toggle voltage assuring the multivibrator will either be fully "on" or fully "off," and assures that marginal trigger voltages in a noise background will not cause erratic triggering of the multivibrator.

One practical application of the circuits of this invention, may be visualized by referring to the voltage diagrams of FIGURE 2. The series of pulses of gradually varying amplitude shown on line 50 can be expected to be modulated by the erratic noise voltage of line 51, so that the resultant demodulated series of pulses of line 52 are no longer smoothly variable a on line 50. Lines 52*a* and 52*b* may represent the two levels of grid-cathode bias of tube 10 which can be measured with and without incoming pulse signals. It is to be noted that pulses *a, b,* and *c* fail to trigger the multivibrator and that no output pulse, represented on line 53, appears until pulse *d* arrives. Thereafter, the succession of pulses produce output signals even though the signals, such as, *e, f, g,* etc., may drop below the first threshold level. Only when the pulse *h,* well below the minimum threshold, arrives does the multivibrator cease to respond.

Many multivibrators of the one-shot type may be substituted for the specific multivibrator shown. Likewise, many rectifiers and filters 30 may be employed. The only requirement of the rectifier filter is that it samples the output voltage of one amplifier of the multivibrator, and regeneratively alter the threshold bias of the trigger circuit as the amplitude of the trigger pulse changes through a predetermined threshold level. Many modifications may be made in the circuits of this invention without departing from the scope of the appended claims.

What is claimed is:

1. In combination in a pulse triggered multivibrator system, a monostable multivibrator with a trigger circuit for switching the multivibrator momentarily to the unstable state in response to pulses greater in amplitude than a predetermined threshold bias voltage, a peak detector coupled to one output circuit of said multivibrator for deriving a direct current voltage proportional to the peak amplitude of the pulses produced in said output circuit by triggering pulses in said triggering circuit, an integrating circuit coupled to said peak detector for smoothing the pulses of said detector, and means for applying the mentioned derived direct current voltage regeneratively to said triggering circuit to reduce said threshold voltage.

2. A triggered multivibrator comprising two amplifiers with cross-coupled feedback circuits, respectively, between the output of one amplifier and the input of the other, and with a common cathode-electrode bias resistor for biasing to cut off the cathode-electrode of the one amplifier which is inactive in the stable state of the multivibrator; a source of positive-going trigger pulses coupled to the control electrode of said one amplifier, and means responsive to the pulse output of one of said amplifiers for changing the bias on the control electrode of said one amplifier in a positive direction after receipt of the first pulse from said source of triggering potential.

3. In the multivibrator defined in claim 2, said means for changing the bias on the control electrode comprising a rectified coupled to said output of said one amplifier, a resistance-capacitance network coupled between said rectifier and said control electrode, the time constant of said network being relatively high compared to the intervals between triggering pulses.

4. A monostable multivibrator comprising an amplifier device with a control electrode and an output electrode and with circuits for producing alternate distinct conducting and nonconducting states in said amplifier, a source of triggering pulses coupled to said control electrode for momentarily reversing said states, a bias source connected to said control electrode to establish a threshold voltage the value of which must be exceeded by the voltage of triggering pulses to effect reversal of said states, a peak detector coupled to said output electrode for generating a direct current voltage proportional to the peak voltage of pulses appearing in the output of said amplifier and means for applying said direct current voltage to said control electrode, said direct current voltage being so polarized as to regeneratively change the control electrode bias upon receipt of a triggering pulse.

5. In combination, a source of a series of pulses, said pulses being smoothly modulated in amplitude with a signal wave and erratically modulated in amplitude with noise, a multivibrator of the monostable type include two amplifiers with coupling circuits connected, respectively, between the control electrode of one amplifier and the output electrode of the other amplfier, the time constants of said two coupling circuits having predetermined relative values of establishing a desired duty cycle for said monstable multivibrator, said source of modulated pulses being coupled to the control electrode of one amplifier for applying said pulses to said control electrode of said one amplifier, and driving said multivibrator to the unstable state by each pulse, a rectifier and a condenser coupled across the output circuit of one of said two amplifiers, said condenser being coupled to said rectifier to be charged to a voltage corresponding to the peak voltgae of the pulses, and means for applying the condenser voltage across the input circuit of said one amplifier for biasing said control electrode regeneratively in response to a series of predetermined number of said pulses.

References Cited in the file of this patent

UNITED STATES PATENTS

| | | |
|---|---|---|
| 2,423,931 | Etter | July 15, 1947 |
| 2,489,269 | Cleeton | Nov. 29, 1949 |
| 2,515,052 | Mitchell | July 11, 1950 |
| 2,864,007 | Clapper | Dec. 9, 1958 |
| 2,920,247 | Fisher | Jan. 5, 1960 |